(No Model.)

R. COWEN.
STEAM HOSE AND THE MANUFACTURE OF THE SAME.

No. 344,250. Patented June 22, 1886.

WITNESSES:
H. Brown
C. J. Loomis.

INVENTOR:
Robert Cowen,
by Wright, Brown & Croseley,
attys.

UNITED STATES PATENT OFFICE.

ROBERT COWEN, OF CAMBRIDGE, MASSACHUSETTS, ASSIGNOR TO THE BOSTON WOVEN HOSE COMPANY, OF PORTLAND, MAINE.

STEAM-HOSE AND THE MANUFACTURE OF THE SAME.

SPECIFICATION forming part of Letters Patent No. 344,250, dated June 22, 1886.

Application filed March 4, 1886. Serial No. 194,051. (No model.)

*To all whom it may concern:*

Be it known that I, ROBERT COWEN, of Cambridge, in the county of Middlesex and State of Massachusetts, have invented certain new and useful Improvements in Steam-Hose and the Art of Manufacturing the Same, of which the following is a specification.

My invention relates to steam-hose, and to the art of manufacturing the same, and has for its object the construction of an article of the character mentioned which shall possess greater strength to resist a bursting-pressure, and in which the lining-tube shall have longer "life" than hose of this class as commonly constructed.

To the foregoing ends my invention consists in an improved steam-hose having a lining-tube composed of interior and outer layers of pure gum, and an intermediate layer or layers of a hard compound, or a layer of hard compound containing plumbago, the whole surrounded or covered with a woven jacket or jackets, constituting the hose proper, in which the weft or filling strands run continuously and spirally around the entire length of the hose.

My invention also consists in the art of manufacturing hose of the character mentioned, all as hereinafter fully described, and subsequently pointed out in the claims.

Figure 1:
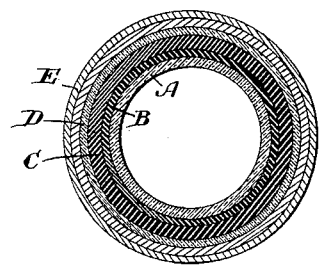
Figure 2:
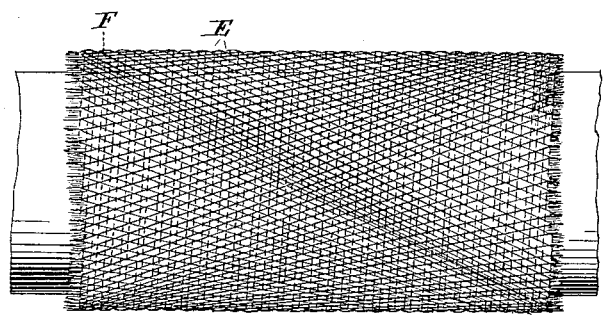

In the drawings hereto annexed, and forming a part of this specification, Figure 1 represents a cross-section of my improved steam-hose, and Fig. 2 a side view thereof.

The same letters of reference indicate the same parts in both figures.

In carrying out my invention I construct a lining-tube, consisting of an interior layer, A, of pure gum, or gum substantially without sulphur, which layer I surround with a layer, B, of a rubber compound commonly employed in the manufacture of steam-hose, following this with a layer, C, of a comparatively hard compound containing plumbago, surrounding this with an outer layer, D, of a compound similar to that composing the interior layer, and, as constituting the hose proper, weave around the lining-tube thus formed one or more jackets, E, in which the weft or filling strands F (represented in dotted lines in Fig. 2) run continuously or spirally around the hose through its entire length.

I have found by experience that soft rubber, or what is commonly known as "pure gum," is better adapted to resist the action and heat of steam than hard rubber, and yet if the lining-tube were composed entirely of soft rubber, after it became still further softened by the heat of the steam the pressure of the latter would tend to force it out through the meshes of the woven inclosing-tube or hose proper, thus impairing the life and usefulness of the hose. By interposing in the lining-tube, between the interior and exterior layers of soft rubber, a layer or layers of hard rubber, as I have described, this difficulty is entirely overcome, and I obtain the best results of both layers without any of the objectionable effects of either.

A hose-lining tube constituted as above set forth will be "cured" just sufficiently to stick strongly to the fabric constituting the hose proper, and will be unaffected by the steam passing through it, except to be, in time, thoroughly cured thereby.

The strength of rubber steam-hose as commonly constructed, as is well known, depends upon the sticking power of the rubber between the different layers of duck surrounding the lining-tube and constituting the jacket or hose proper, and after steam has passed through it for a short time the rubber between the plies becomes softened, when the latter will uncoil or give way, and the hose will swell or blister and burst.

By constructing my jackets or hose proper wholly of woven fabric (two layers or woven tubes being preferred) in which the weft or filling strand runs spirally and continuously therearound through the whole length of the hose, and combining such jacket or jackets with a lining-tube composed of interior and exterior layers of pure gum and an intermediate layer or layers of hard compound, I am enabled to produce a hose of great strength, and one that will not only not "give way" or burst from the cause mentioned, but, by reason of the fact that it will require comparatively long use to cure the lining-tube by the action of the steam passing through it to the point at which ordinary hose is cured before being used, will last very much longer, and at the same time cost less to manufacture than any hose for a similar purpose now known to me.

In the construction of the lining-tube for my hose I sometimes change the positions of the hard-compound layers B and C, placing the former adjacent to the outer soft layer, D, and the latter or layer C next to the interior layer, A; and sometimes I omit the layer B of ordinary compound altogether, though I prefer to construct the lining-tube as described, and represented in the drawings.

What I claim is—

1. A steam-hose consisting of a lining-tube composed of interior and exterior layers of pure gum and an interior layer or layers of hard compound, combined with an inclosing-tube, constituting the hose proper, composed of one or more thicknesses or layers of fabric woven around the lining-tube, in which the weft or filling strands run spirally and continuously through the entire length of the hose, substantially as set forth.

2. A steam-hose consisting of a lining-tube composed of interior and exterior layers of pure gum and an interior layer of hard compound containing plumbago or other hardening compound, combined with an inclosing-tube, constituting the hose proper, composed of layers of fabric woven around the lining-tube, in which the weft or filling strands run spirally or continuously through the entire length of the hose, substantially as set forth.

3. The improvement in the art of manufacturing steam-hose, which consists in forming a lining-tube with an interior and exterior layer of pure gum, or gum lightly compounded with hardening material, and an interior layer or layers of hard compound, and weaving a tube or tubes of fabric, constituting the hose proper, around the lining-tube thus formed, in which woven tube or tubes the weft or filling strands run spirally and continuously through the entire length, substantially as set forth.

In testimony whereof I have signed my name to this specification, in the presence of two subscribing witnesses, this 16th day of February, 1886.

ROBERT COWEN.

Witnesses:
ARTHUR W. CROSSLEY,
H. BROWN.